United States Patent [19]

Fambrough

[11] Patent Number: 4,723,802
[45] Date of Patent: Feb. 9, 1988

[54] ROTARY WEED EXTRACTOR

[76] Inventor: David G. Fambrough, 13205 S. Hills Dr., Reno, Nev. 89511

[21] Appl. No.: 793,539

[22] Filed: Oct. 31, 1985

[51] Int. Cl.⁴ .......................... A01B 45/00; A01B 1/16
[52] U.S. Cl. ..................................... 294/50.6; 172/25;
172/41; 175/385
[58] Field of Search ...................... 172/25, 41, 111, 21,
172/22, 371, 378, 381; 254/131.5, 132;
294/50.6, 50.7, 19.1, 19.3, 50.5, 121; 175/385,
389, 390, 391, 411, 394; 30/347, 500, 302;
D15/12

[56] References Cited

U.S. PATENT DOCUMENTS

| 757,739 | 4/1904 | Haines | 175/391 X |
|---|---|---|---|
| 799,359 | 9/1905 | Shaffer | 172/25 |
| 1,371,137 | 3/1921 | Albers | 175/394 X |
| 1,990,341 | 2/1935 | Meyer | 175/394 X |
| 3,051,253 | 8/1962 | McCann | 175/385 X |
| 3,129,771 | 4/1964 | Lidstone | 172/25 |
| 3,356,168 | 12/1967 | Johnson | 175/385 X |

FOREIGN PATENT DOCUMENTS

| 463168 | 4/1951 | Italy | 175/385 |
|---|---|---|---|
| 15552 | of 1900 | United Kingdom | 175/394 |
| 11790 | of 1904 | United Kingdom | 294/50.6 |
| 271287 | 5/1927 | United Kingdom | 294/50.6 |

Primary Examiner—Richard T. Stouffer

[57] ABSTRACT

A rotary driven elongated pointed rod member having wingnut-like projections affixed thereto. The wingnut-like projections being spaced apart sufficient distances for contacting weeds and undesired plants at interval points when the device is moved beneath the surface of the ground while being rotated. The projections grip and wind the weed about the rod and then retain the weed and its roots and carry the unwanted wood and its root system out of the soil. The projections can depend straight downwardly or can be canted to form a spiral soil entering action. Following the withdrawal of the weed the loose soil that has been pulverized and aerated is left in the hole that had been formed by the weed removing action.

4 Claims, 9 Drawing Figures

U.S. Patent  Feb. 9, 1988  4,723,802
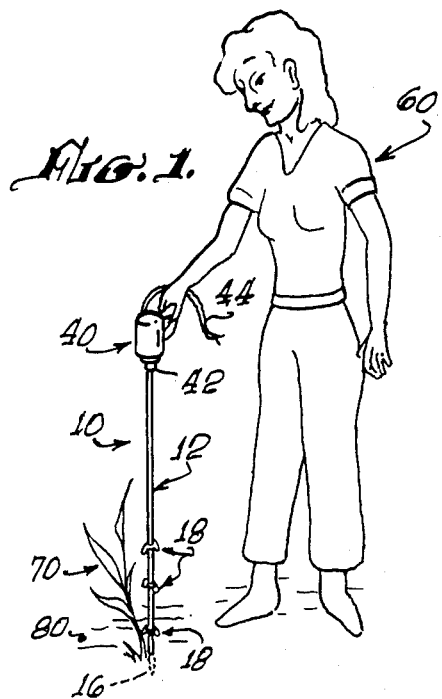
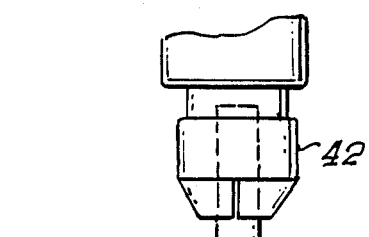
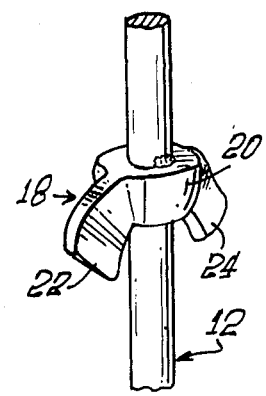
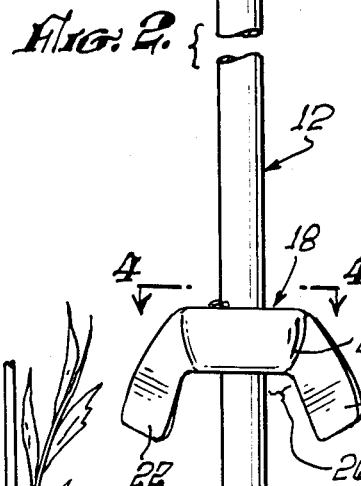
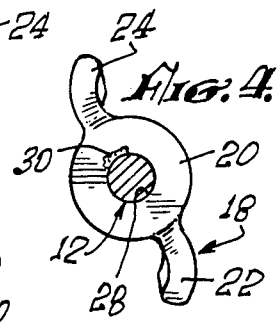
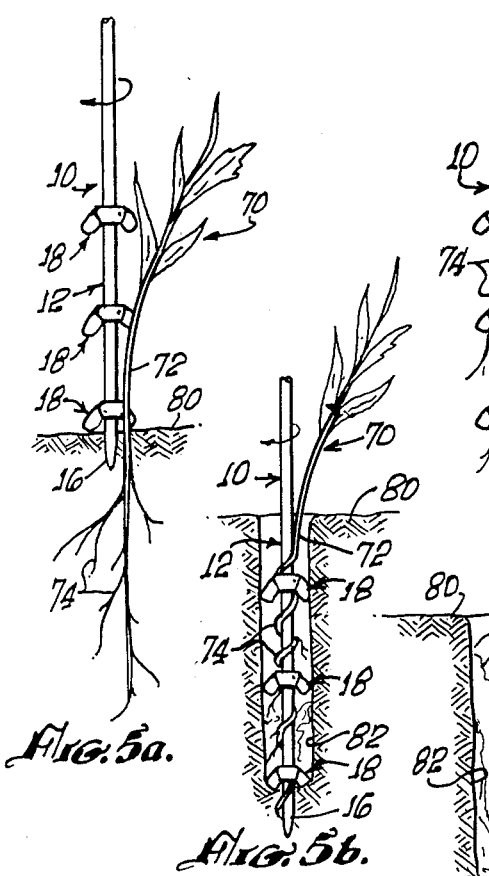
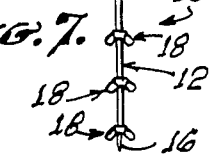

ROTARY WEED EXTRACTOR

CROSS REFERENCE TO RELATED PATENT APPLICATIONS

This patent application is not related to any other patent applications filed by me in the United States Patent and Trademarks Office.

BACKGROUND OF THE INVENTION

1. Field of the Invention

This invention is in the field of weed removing and soil aerating tools designed to easily and efficiently remove undesirable weeds and plants and do so without damaging the soil and its environs following such removal. Actually, the soil is beneficially aerated following such action.

2. Background of the Invention

Weed removing tools have been developed and marketed in the past which encompass the weed either by application of a tool pressed into the soil alongside the weed and then with a levered action lift the weed and some of the soil alongside it upwardly in order to pull the weed and its root system out of the soil or by pressing a cylindrical or rectangular tube-like cutter element over the weed or undesired plant into the soil about the weed. Attachments added to these devices attempt to grip the weed and withdraw it when the tool is removed. Ugly holes are left behind with these types of tools and much effort has to be put forth to refill and replant the areas affected should the weed be removed in a lawn, or the like. Usually, despite much effort, the root system of the weed is left behind only to regenerate the problem for another day. Such tools as described above have been developed for both standing, stooping, or crouching upon the knees while being used. Therefore, a solution to the aforementioned problems has been sought for some time without satisfactory results.

SUMMARY OF THE INVENTION

The present device developed by the Applicant has provided a simple tool that allows for easy attachment to a power tool and allows the operator to swiftly and easily place the rotating tool alongside a weed or undesired plant while standing comfortably alongside the weed. As the tool rotates at any selected speed, depending on the type of soil and weed, the tool is easily inserted into the soil alongside the weed to a depth determined by the operator.

The affixed wingnut-like downwardly projecting weed encompassing members positively and thoroughly wind the seed and its root system about the elongated shank while at the same time disturbing the soil about the weed to a loosely aerated condition. The apexes of the spaces formed by the downwardly projection wings and the shank firmly accept and grip the weed and its root system so that the latter can be withdrawn from the soil when the tool is pulled out by the operator. A reverse rotational drive can be applied to the tool if it shows resistance from being withdrawn from the hole formed.

It is therefore an object of the present invention to provide a weed removing tool that can be rotated and inserted into the soil alongside a weed or undesired plant.

Another object of the invention is to provide a tool that can be transported easily to various locations closer in proximity to weed infested areas.

A further object of the invention is to provide a tool that is inexpensive to manufacture and that can be formed from conventional products available in the marketplace.

Another object of the invention is to provide a tool which can be used by any operator without a lot of education, training or strength.

A further object of the present invention is to provide a tool which will not deface a soil area that has had its weeds removed.

Another object of the present invention is to provide a tool that will simultaneously leave a condition of the soil that has been aerated following the removal of a weed or undesired plant.

These and other objects and advantages of the present invention will become apparent to those skilled in the art ater considering the following detailed Specification together with the accompanying drawings.

BRIEF DESCRIPTION OF THE DRAWINGS

FIG. 1 is perspective view of the device being utilized as a weed removing and soil aerating apparatus by an operator;

FIG. 2 is an enlarged side elevation, partly broken away, of the device of FIG. 1;

FIG. 3 is a fragmentary enlarged perspective of a portion of the device of FIG. 1;

FIG. 4 is a sectional view as viewed along line 4—4 of FIG. 2 showing one of the wingnut-like members incorporated in the invention;

FIGS. 5a, 5b and 5c are side elevational views, partly in section, of various placements of the device of FIGS. 1-4 during its use as a weed removing and soil aerating tool;

FIG. 6 is a view similar to FIG. 4 but showing an alternate embodiment of the wingnut-like members; and FIG. 7 is a view on a reduced scale showing another method of rotating the device of FIGS. 1 through 6.

DESCRIPTION OF A PREFERRED EMBODIMENT

Referring to the drawings, and particularly to FIGS. 1 and 2, reference numeral 10 shows tool constructed according to the present invention.

In FIG. 1, an operator 60, shown as a woman, is holding a rotating power drill 40 into which the tool 10 is inserted and held by a chuck assembly 42. An extension cord 44 is shown connected to the power tool and in turn is connected at its other end (not shown) to an electrical power supply.

Again in FIG. 1, a weed or undesired plant 70 is shown growing in the ground 80. The tool is shown as being placed into the ground adjacent the weed to be removed.

As is shown in more detail in FIG. 2, the tool 10 is constructed with a shank or rod 12 having a steel rod, or the like, 14. The end 16 opposite the end that is retained in the chuck is tapered to a desired point so as to be easily inserted into the ground adjacent the weed.

Wingnut-like members 18 are shown affixed at spaced intervals along the length of the shaft 12 at predetermined distances apart depending on the length of the shaft 12 and the number of elements 18 desired. These wingnut-like members 18 comprise a main body portion 20 which has a pari of flat ears 22 and 24 affixed thereto.

These ears can be formed simultaneously with the body 20 such is done at present in the manufacture of wingnuts, and the like, or they can be attached by weldment or forging, depending on the selected method of manufacture.

It can be seen that the flat wings 22 and 24 form a space 26 into which weeds and their root structures can be entrapped during the weed removing procedure to be described later in this application. The extent of these spaces 26 can be predetermined by the type of wingnut used and by the diameter of the shank 14. During the downward movement of the tool into the soil alongside the weed the rotational clockwise movement of the elements 18 envelope the stems and roots of the weed and wind these elements about the shaft 12. The spaces 26 provide the stems and roots an inverted "V"-like pocket that further grips the stems and toots with a wedging action.

In the forming of the tool during manufacture, I have provided an opening 28 to allow the element 18 to be placed at a desired location along the central portion 14 of the shaft 12 and have affixed the element to the shaft element by a spot of weldment 30. Other methods such as press fitting, shouldered shafts and brazing can be used as a method of securement, but that is well known in the art and need not be limited to the method shown.

While an electric hand drill 40 is shown to be the source of power for the rotation of the tool 10, it is understood that other powered or manual devices can be used for the same result. I have shown in FIG. 7 of the drawings a brace device having a chuck 52 and a rotatable handle knob 54 for accomplishing this rotational and downwardly pressing force to the tool 10.

In operating the removal of the weed and for the purpose of aerating the soil at the same time, a person 60 places the tool adjacent a weed 70 so that the pont of the tool is close in proximity to the bace of the stem nearest the ground. Downward pressure and the rotating action of the tool 10 then proceeds to grasp and to wind up the parts of the weed beneath the ground. Both the stem 72 and the root projections 74 are then withdrawn from the soil upwardly above the ground level 80. This withdrawal can be done while the tool is no longer rotating or while it is rotating in a reverse direction to more easily perform the withdrawal procedure. It is seen in FIG. 5c that the remaining soil left in the hole is in a state of having been mixed with air and is loosely retained in the hole. No soil to any extent has been withdrawn from the newly formed hole to be left in mounds in the proximity of the spot where the weed had been removed and the same soil does not form a deeply embedded hole after it has been watered in further operations.

FIG. 6 shows that the projections 24 can be oriented straight downwardly rather than slightly spirally as in the earlier described form. This alternate embodiment 118 may be used in more sandy or softer soils where it is not as necessary to attempt a drill-like action in order to sink the tool down below the surface of the soil.

While the embodiments described above are shown for the purposes of illustration only, and not for the purposes of limitation, the following are the claims presented in this matter.

I claim:

1. An apparatus for removing weeds and other unwanted plants from the soil comprising:
    an elongated shaft tapered to a point at one end thereof;
    a plurality of wingnut-shaped members rigidly affixed to said shaft and spaced longitudinally along the length of said shaft at selected locations between said tapered end and the end of said shaft opposite said tapered end; each of said wingnut-shaped members having the shape of a conventional wingnut as seen in side view including a pair of oppositely directed flattened wing extensions affixed to an enlarged element; each of said extensions having an outwardly directed portion also directed longitudinally along the length of said shaft toward said tapered end of said shaft; said outwardly and longitudinally directed portion forming an angle with said shaft sufficient to direct weeds and other unwanted plants inwardly toward said shaft during rotation thereof in a clockwise direction; and
    rotational force applying means connected to said shaft for causing rotation of said shaft about its longitudinal axis.

2. The apparatus of claim 1 wherein said extensions are spirally formed about the longitudinal axis of said shaft in a clockwise directed attitude.

3. The apparatus of claim 1 wherein said rotational force applying means is an electrically operated hand drill with variable speed control and reversing capability.

4. The apparatus of claim 1 wherein said rotational force applying means is a hand-operated brace.

* * * * *